Patented June 10, 1930

1,762,742

UNITED STATES PATENT OFFICE

WALTER REPPE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS OF PRODUCING PRIMARY AMINES

No Drawing. Application filed February 11, 1927, Serial No. 167,582, and in Germany February 9, 1926.

I have found that the primary amines derived from aliphatic and cyclic bodies, hitherto obtainable only with difficulty, may readily be obtained and with excellent yields, by causing hydrogen to act on the corresponding vaporized carbonyl compounds, i. e. aldehydes and ketones, or their ammonia compounds in the presence of catalysts and gaseous ammonia preferably in excess over the required amount. Any of the catalysts ordinarily employed for hydrogenations may be used and especially catalysts which contain activating admixtures. It is often advisable to add to the hydrogenating catalyst a substance, such as aluminium phosphate, aluminium oxid or the like, which is furthering splitting off water. Inert gases including restricted amounts of water vapor may also be present.

The following examples will further illustrate how the said invention may be carried into practical effect, but the invention is not limited to these examples.

Example 1

Cyclohexanone is vaporized in a mixture of 70 per cent of hydrogen and 30 per cent of gaseous ammonia and the mixture is passed, at a temperature of from 130 to 140° C. over a nickel catalyst, the proportion of cyclohexanone in the current of gas entering the catalyst chamber being preferably maintained at between 1 and 2 per cent. The catalyst may be prepared, for example, by depositing 100 grammes of basic nickel carbonate and 60 grammes of water glass on 1 litre of granulated pumice, followed by reduction in a current of hydrogen at a temperature of 300 to 320° C. In addition to insignificant amounts of secondary and tertiary amines, the condensate obtained on cooling the reaction gases contains an approximately quantitative yield of cyclohexylamine. The greater portion of the resulting cyclohexylamine can be recovered in a pure state (its boiling point being 134 to 135° C.) by distilling the condensate. A further portion passes over with the water of the reaction, in the first runnings, and can also be recovered, in a pure state, by drying and subsequent distillation. The mixture of ammonia and hydrogen issuing from the condenser is preferably led back in circulation into the vaporizer.

Example 2 n-butyl aldehyde is vaporized with a mixture of 40 per cent of ammonia and 60 per cent of hydrogen, and passed over the nickel contact material at a temperature of from 110° to 120° C. as described in Example 1. A good yield of n-butylamine is obtained, together with small quantities of secondary and tertiary amines.

Example 3

Isobutylaldehyde ammonia is vaporized with a mixture of 30 per cent of ammonia and 70 per cent of hydrogen and treated as described in Example 2. An excellent yield of isobutylamine can be recovered from the reaction product together with small quantities of the higher substituted amines.

The conditions of the reaction may be varied within wide limits. For example, the temperature may be higher or lower, being in general, between 100 and 200° C. The efficiency and durability of the catalyst may be improved by the addition of activators, such as zinc oxid, magnesium oxid and the like.

Example 4

Isobutylaldehyde is vaporized in a mixture of 50 per cent of hydrogen and 50 per cent of gaseous ammonia at a temperature of about 150° C. and the mixture is passed over a nickel catalyzer at a temperature of 130° C., the concentration of the isobutylaldehyde vapor in the current of gas being about 4 per cent. The nickel catalyst is prepared by depositing 100 grammes of basic nickel carbonate, 60 grammes of chromic oxid and 60 grammes of water glass on 1 litre of granulated pumice, followed by reduction at a temperature of 300 to 320° C. Apart from the water of the reaction and a little dissolved ammonia, the condensate obtained by cooling the reaction gases consists entirely of an excellent yield of isobutylamine.

*Example 5*

Propylaldehyde is vaporized in a mixture of 60 per cent of hydrogen and 40 per cent of ammonia at a temperature of about 150° C., and the mixture is passed over a nickel catalyst at a temperature of about 130° C., the concentration of the propylaldehyde in the current of gas being about 5 per cent. The nickel contact is prepared by depositing 100 grammes of basic nickel carbonate, 60 grammes of aluminium phosphate and 60 grammes of water glass on 1 litre of granulated pumice, followed by reduction at a temperature of from 300 to 320° C. A good yield of propylamine, together with a little dipropylamine, can be isolated from the condensate in any known manner.

In a similar manner isopropylamine can be obtained from acetone, isoamylamine from isovaleraldehyde, isohexylamine from isocapronicaldehyde and so on.

In the appended claims, I use the term "carbonyl compound" to designate a carbonyl compound of a hydrocarbon, an amine of which is desired to be produced.

I claim:

1. The process of producing primary amines which comprises passing a vaporized carbonyl compound mixed with hydrogen and gaseous ammonia at an elevated temperature over a hydrogenation catalyst.

2. The process of producing primary amines which comprises passing a mixture of aldehyde vapor, hydrogen and an excess of gaseous ammonia, at an elevated temperature over a hydrogenation catalyst.

3. The process of producing primary amines which comprises vaporizing an ammonia compound of an aldehyde, and passing the said vapors, mixed with hydrogen and gaseous ammonia, at an elevated temperature over a hydrogenation catalyst.

4. The process of producing primary amines which comprises passing a vaporized carbonyl compound mixed with hydrogen and an excess of gaseous ammonia at an elevated temperature over a hydrogenation catalyst comprising a dehydration catalyst.

In testimony whereof I have hereunto set my hand.

WALTER REPPE.